US008427135B2

(12) United States Patent
Koski et al.

(10) Patent No.: US 8,427,135 B2
(45) Date of Patent: Apr. 23, 2013

(54) DIRECTIONAL SPEED SENSING SYSTEMS AND METHODS

(75) Inventors: Jack P. Koski, South Lyon, MI (US); Heidi L. Simmons, Belleville, MI (US)

(73) Assignee: GM Global Technology Operations LLC

( * ) Notice: Subject to any disclaimer, the term of this patent is extended or adjusted under 35 U.S.C. 154(b) by 513 days.

(21) Appl. No.: 12/561,596

(22) Filed: Sep. 17, 2009

(65) Prior Publication Data

US 2011/0025307 A1 Feb. 3, 2011

Related U.S. Application Data

(60) Provisional application No. 61/229,050, filed on Jul. 28, 2009.

(51) Int. Cl.
*G01P 3/48* (2006.01)

(52) U.S. Cl.
USPC .......... 324/173; 324/207.25; 324/117 R; 324/117 H; 324/126; 324/127

(58) Field of Classification Search .......... 324/173, 324/160, 161, 165, 117 R, 117 H, 126–127, 324/207.11–207.25, 166, 174
See application file for complete search history.

(56) References Cited

U.S. PATENT DOCUMENTS

| 4,737,710 | A   | * | 4/1988 | Van Antwerp et al. ..... 324/207.2 |
| 2001/0009367 | A1 | * | 7/2001 | Seitzer et al. ............ 324/207.21 |
| 2003/0141862 | A1 | * | 7/2003 | Vig et al. ..................... 324/174 |
| 2010/0026279 | A1 | * | 2/2010 | Vig et al. ..................... 324/173 |

FOREIGN PATENT DOCUMENTS

| DE | 19838433 | 3/1999 |
| DE | 102004009715 | 9/2005 |
| DE | 102004011807 | 9/2005 |
| DE | 102006026921 | 12/2007 |
| EP | 0412200 | 2/1991 |

OTHER PUBLICATIONS

Office Action dated Jan. 13, 2012 from the German Patent Office for German Patent Application No. 10 2010 031 906.6, 5 pages.

\* cited by examiner

*Primary Examiner* — Huy Q Phan
*Assistant Examiner* — Temilade S Rhodes-Vivour

(57) ABSTRACT

A directional speed sensor comprises first and second Hall-effect modules. The first Hall-effect module outputs a first current pulse for a first predetermined period when a tooth of a toothed wheel that rotates with a shaft of the vehicle passes the first Hall-effect module in a first rotation direction and outputs the first current pulse for a second predetermined period when the tooth passes the first Hall-effect module in a second rotational direction. The second Hall-effect module is electrically connected in parallel with the first Hall-effect module, is angularly offset from the first Hall-effect module with respect to a center of the shaft, outputs a second current pulse for the first predetermined period when the tooth of the toothed wheel passes the second-Hall-effect module in the first direction, and outputs the second pulse for the second predetermined period when the tooth passes the second Hall-effect module in the second direction.

20 Claims, 4 Drawing Sheets

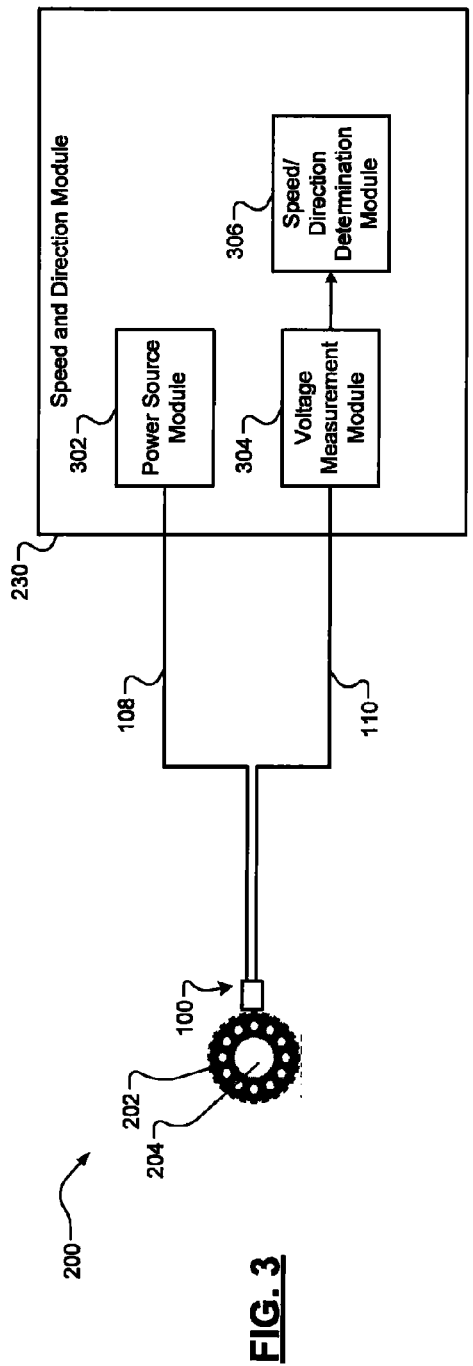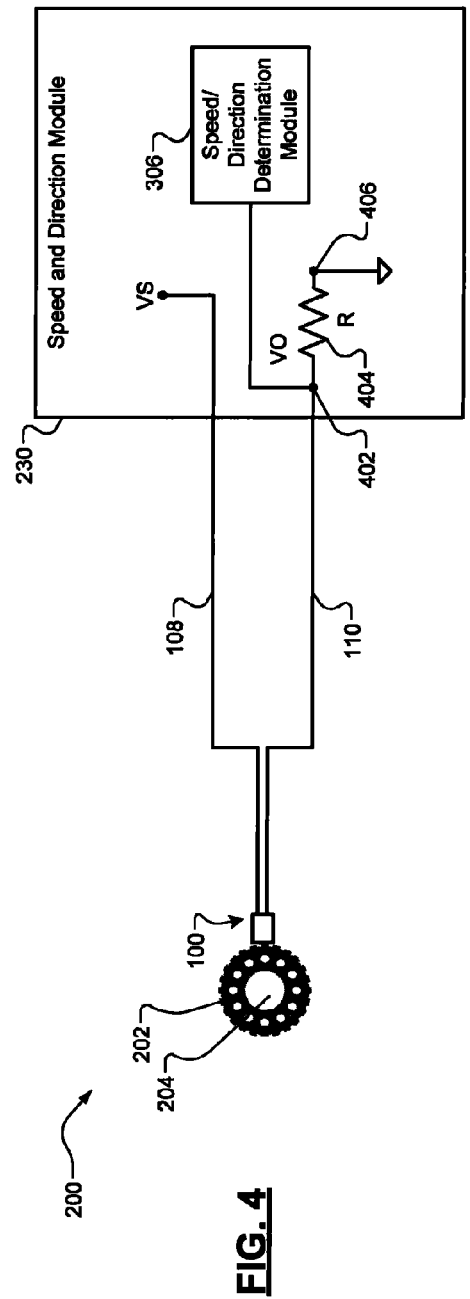

US 8,427,135 B2

DIRECTIONAL SPEED SENSING SYSTEMS AND METHODS

CROSS-REFERENCE TO RELATED APPLICATIONS

This application claims the benefit of U.S. Provisional Application No. 61/229,050, filed on Jul. 28, 2009. The disclosure of the above application is incorporated herein by reference in its entirety.

FIELD

The present disclosure relates to vehicles and more particularly to speed sensing systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine combusts an air and fuel mixture within cylinders to produce torque for a vehicle. An engine control module (ECM) controls the torque output of the engine. The ECM may control the torque output of the engine based on inputs provided to the ECM and operating parameters measured by sensors located throughout the vehicle. For example only, the vehicle may include temperature, pressure, humidity, and speed sensors.

SUMMARY

A directional speed sensor for a vehicle comprises a first Hall-effect module and a second Hall-effect module. The first Hall-effect module outputs a first current pulse for a first predetermined period when a tooth of a toothed wheel that rotates with a shaft of the vehicle passes the first Hall-effect module in a first direction of rotation and outputs the first current pulse for a second predetermined period when the tooth passes the first Hall-effect module in a second direction of rotation. The second Hall-effect module is electrically connected in parallel with the first Hall-effect module, is angularly offset from the first Hall-effect module with respect to a center of the shaft, outputs a second current pulse for the first predetermined period when the tooth of the toothed wheel passes the second-Hall-effect module in the first direction, and outputs the second pulse for the second predetermined period when the tooth passes the second Hall-effect module in the second direction. The second predetermined period is one of greater than and less than the first predetermined period. The second current pulse is generated one of before and after the first current pulse.

A directional speed sensor system comprises the directional speed sensor and a speed and direction module. The speed and direction module monitors voltage pulses corresponding to current pulses output by the directional speed sensor, determines which one of the first and second directions that the shaft is rotating based on at least one of the voltage pulses, and determines a rotational speed of the shaft based on at least one of the voltage pulses.

In still other features, the speed and direction module determines the one of the first and second directions that the shaft is rotating based on a period of the at least one of the voltage pulses.

In further features, the speed and direction module determines that the shaft is rotating in the first direction when the period of the at least one of the voltage pulses is approximately equal to the first predetermined period.

In still further features, the speed and direction module determines that the shaft is rotating in the second direction when the period of the at least one of the voltage pulses is approximately equal to the second predetermined period.

In other features, the speed and direction module determines the rotational speed of the shaft based on a period between two consecutive ones of the voltage pulses.

In still other features, the speed and direction module determines the rotational speed of the shaft based on a number of the voltage pulses during a predetermined period.

In further features, the speed and direction module determines the rotational speed of the shaft based on a period between two of the voltage pulses corresponding to two current pulses generated by one of the first and second Hall-effect modules.

In still further features, the first and second Hall-effect modules receive power via a first wire and output the first and second current pulses via a second wire. A total number of wires electrically connected to the directional speed sensor is limited to two.

In other features, centerlines of the first and second Hall-effect modules are separated by a distance that is one of less than and equal to a length of the tooth.

A directional speed sensor for a vehicle comprises a first Hall-effect module and a second Hall-effect module. The first Hall-effect module generates a first pulse in an output current of the directional speed sensor for a first predetermined period when a tooth of a toothed wheel that rotates with a shaft of the vehicle passes the first Hall-effect module in a first rotational direction and generates the first pulse for a second predetermined period when the tooth passes the first Hall-effect module in a second rotational direction. The second Hall-effect module is angularly offset from the first Hall-effect module with respect to a center of the shaft, generates a second pulse in the output current for the first predetermined period when the tooth of the toothed wheel passes the second Hall-effect module in the first rotational direction, and generates the second pulse for the second predetermined period when the tooth passes the second Hall-effect module in the second rotational direction. The second predetermined period is one of greater than and less than the first predetermined period. The second pulse is generated one of before and after the first pulse.

A directional speed sensor system comprises the directional speed sensor and a speed and direction module. The speed and direction module monitors pulses output by the directional speed sensor, determines which one of the first and second directions that the shaft is rotating based on at least one of the pulses, and determines a rotational speed of the shaft based on at least one of the pulses.

In other features, the speed and direction module determines the one of the first and second directions that the shaft is rotating based on a period of the at least one of the pulses.

In still other features, the speed and direction module determines that the shaft is rotating in the first direction when the period of the at least one of the pulses is approximately equal to the first predetermined period.

In further features, the speed and direction module determines that the shaft is rotating in the second direction when the period of the at least one of the pulses is approximately equal to the second predetermined period.

In still further features, the speed and direction module determines the rotational speed of the shaft based on a period between two consecutive ones of the pulses.

In further features, the speed and direction module determines the rotational speed of the shaft based on a number of the pulses during a predetermined period.

In still further features, the speed and direction module determines the rotational speed of the shaft based on a period between two of the pulses corresponding to two pulses generated by one of the first and second Hall-effect modules.

In other features, the first and second Hall-effect modules receive power via a first wire and output the first and second pulses via a second wire. A total number of wires electrically connected to the directional speed sensor is limited to two.

In still other features, centerlines of the first and second Hall-effect modules are separated by a distance that is one of less than and equal to a length of the tooth.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

FIGS. 2-4 are functional block diagrams of exemplary implementations of directional speed sensor systems;

DETAILED DESCRIPTION

Figure 1:
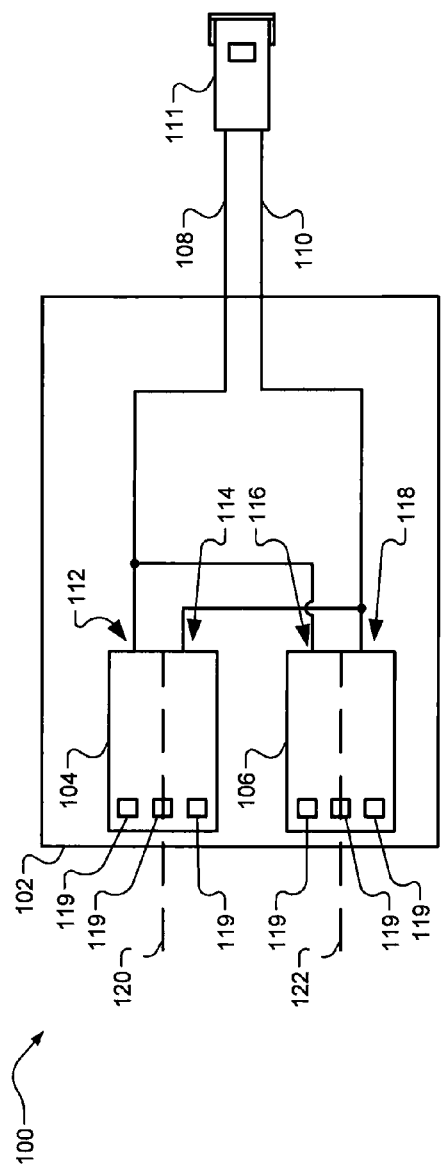
FIG. 1 is an exemplary diagram of a directional speed sensor.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A directional speed sensor according to the present disclosure includes a first Hall-effect module and a second Hall-effect module within a housing of the directional speed sensor. The first and second Hall-effect modules each output a current pulse for a first predetermined period and a second predetermined period when a tooth of a toothed wheel that rotates with a shaft passes in first rotational direction and a second rotational direction, respectively. The second predetermined period is greater than or less than the first predetermined period. Rotational speed of the shaft and direction of the rotation may be determined based on the output of the directional speed sensor.

Referring now to FIG. 1, a functional block diagram of an exemplary implementation of a directional speed sensor 100 for a vehicle is presented. A sensor housing 102 includes a first Hall-effect module 104 and a second Hall-effect module 106. For example only, the first and second Hall-effect modules 104-106 may include Hall-effect modules bearing model number ATS653, supplied by Allegro Microsystems. A magnet source (not shown) may also be included within the sensor housing 102 to generate magnetic flux.

Power is supplied to the directional speed sensor 100 via input wire 108. The directional speed sensor 100 provides an output current via an output wire 110. The output current of the directional speed sensor 100 may be used to determine a rotational speed of an associated shaft as discussed further below. A connector 111 may be included and may provide an easy attachment (e.g., pulg-and-play) to the input and output wires 108 and 110, respectively.

The Hall-effect modules 104-106 each include a positive terminal and a negative terminal. For example only, the first Hall-effect module 104 includes positive and negative terminals 112 and 114, respectively. The second Hall-effect module 106 includes positive and negative terminals 116 and 118, respectively. The positive terminals 112 and 116 of the Hall-effect modules 104 and 106, respectively, are electrically connected to the input wire 108. The negative terminals 114 and 118 of the Hall-effect modules 104 and 106, respectively, are electrically connected to the output wire 110. In this manner, the Hall-effect modules 104-106 are electrically connected in parallel.

The Hall-effect modules 104-106 may each include a plurality of Hall-effect elements 119. While the Hall-effect modules 104-106 are shown as each including three Hall-effect elements 119, the Hall-effect modules 104-106 may include a greater or fewer number of Hall-effect elements 119. The Hall-effect modules 104-106 may also include an amplifier, an analog-to-digital converter, and/or other suitable components (not shown). The Hall-effect elements are sensitive to the changes in the magnetic flux. The Hall-effect modules 104-106 each selectively generate current pulses of predetermined lengths (i.e., pulse widths).

The Hall-effect modules 104 and 106 may be centered along first and second centerlines 120 and 122, respectively. The distance between the first and second centerlines 120-122 may be specified relative to, for example, a length of one tooth of a toothed wheel that rotates with the associated shaft. For example only, the distance between the first and second centerlines 120-122 may be set equal to the length of one tooth of the toothed wheel. Accordingly, the Hall-effect modules 104 and 106 are angularly offset from each other with respect to a center of the associated shaft.

Figure 2:
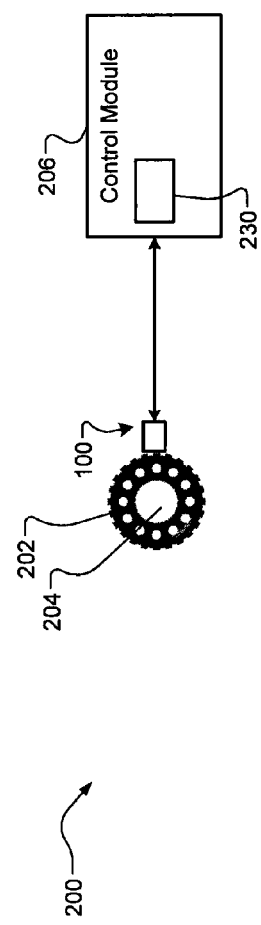

FIG. 2 is a functional block diagram of an exemplary implementation of a directional speed sensor system 200. A toothed wheel 202 is attached to and rotates with an associated shaft 204. For example only, the associated shaft 204 may include a crankshaft, a driveshaft, a transmission input shaft, a transmission output shaft, or another suitable shaft of a vehicle.

The toothed wheel 202 may include N teeth where N is an integer greater than one. The N teeth of the toothed wheel 202 may be spaced equally around the toothed wheel 202. In this manner, leading edges between two of the N teeth may be separated by an angular rotation of 360°/N of the associated shaft 204. In some implementations, the toothed wheel 202 may include a gap (not shown) of one or more missing teeth. The gap may be used to indicate one revolution of the associated shaft 204.

The directional speed sensor 100 outputs a directional speed signal (e.g., a current signal) based on rotation of the toothed wheel 202. The directional speed sensor 100 may receive power from a control module 206, a module within the control module 206, or another suitable power source. The control module 206 may include, for example, an engine control module (ECM), a transmission control module (TCM), a hybrid control module (HCM), a chassis control module, or another suitable control module of a vehicle.

The directional speed sensor 100 outputs the directional speed signal including pulses (e.g., current pulses) that may be collectively referred to as a pulse train. The directional speed sensor 100 generates two pulses of the pulse train as each tooth of the toothed wheel 202 passes the directional speed sensor 100. More specifically, the first Hall-effect module 104 generates one pulse of the pulse train as a tooth of the toothed wheel 202 passes the first Hall-effect module 104. Likewise, the second Hall-effect module 106 generates one pulse of the pulse train as the tooth passes the second Hall-effect module 106.

The length of each pulse generated (i.e., the pulse width) depends on the direction of rotation of the toothed wheel 202. For example only, the directional speed sensor 100 may generate pulses of a first predetermined pulse width and a second predetermined pulse width when the tooth encounters the directional speed sensor 100 in a first direction and a second direction, respectively. The first direction may include a rotational direction that the associated shaft 204 rotates when the vehicle travels forward. The second direction may include a rotational direction opposite of that of the first direction (i.e., one that the associated shaft 204 rotates when the vehicle travels in reverse).

The first predetermined pulse width is one of greater than and less than the second predetermined pulse width. The first predetermined pulse width and the second predetermined pulse width may be calibratable and may be set to, for example, approximately 45 microseconds and approximately 180 microseconds, respectively.

The directional speed signal is provided to the control module 206. More specifically, the directional speed signal may be provided to a speed and direction module 230 implemented within the control module 206. The speed and direction module 230 determines the rotational speed of the associated shaft 204 based on the directional speed signal. The speed and direction module 230 also determines the direction of rotation of the associated shaft 204 based on the directional speed signal. The speed and direction module 230 provides the speed and direction of rotation of the associated shaft 204 to the control module 206. The speed and direction of rotation of the associated shaft 204 may also be provided to one or more other modules of the vehicle.

Referring now to FIG. 3, another functional block diagram of an exemplary implementation of the directional speed sensor system 200 is presented. The speed and direction module 230 may include a power source module 302, a voltage measurement module 304, and a speed/direction determination module 306. In some implementations, the speed/direction determination module 306 may be divided into two separate modules, a speed module that determines the speed of the associated shaft 204 and a direction module that determines the direction of rotation (not shown).

The power source module 302 supplies power to the directional speed sensor 100 via the input wire 108. For example only, the power source module 302 may supply a voltage between approximately 8.0 V and approximately 16.0 V. Supplying voltage to the directional speed sensor 100 induces current flow through the directional speed sensor 100. Current flows through the directional speed sensor 100, and the directional speed sensor 100 outputs current to the voltage measurement module 304 via the output wire 110. The directional speed sensor 100 generates and outputs current pulses based on the rotation of the associated shaft 204 and the toothed wheel 202.

Each tooth of the toothed wheel 202 may include a ferrous material that alters (e.g., concentrates) the magnetic flux that is present around the directional speed sensor 100. The Hall-effect modules 104-106 within the directional speed sensor 100 each generate a current pulse when the magnetic flux around that one of the Hall-effect modules 104-106 is changed by the passing of a tooth of the toothed wheel 202. In this manner, the directional speed sensor 100 generates two current pulses each time that one tooth of the toothed wheel 202 passes the directional speed sensor 100.

Figure 5A:
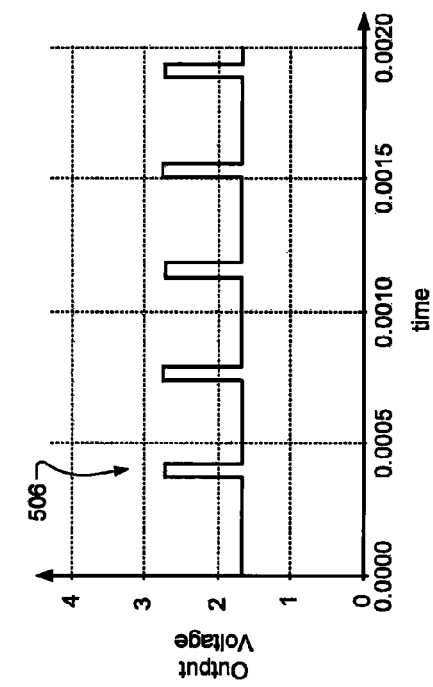
FIGS. 5A-5B are graphs depicting exemplary current and voltage pulses output by a directional speed sensor when a shaft is rotating in a first direction.

The pulse width of the current pulse generated by the Hall-effect modules 104-106 is set based on the direction that the tooth passes. For example only, as shown in FIG. 5A, the first Hall-effect module 104 generates a current pulse 502 of a first predetermined pulse width when the tooth passes the first Hall-effect module 104 in the first direction. The second Hall-effect module 106 generates a current pulse 504 of the first predetermined pulse width when the tooth passes the second Hall-effect module 106 in the first direction.

Figure 6A:
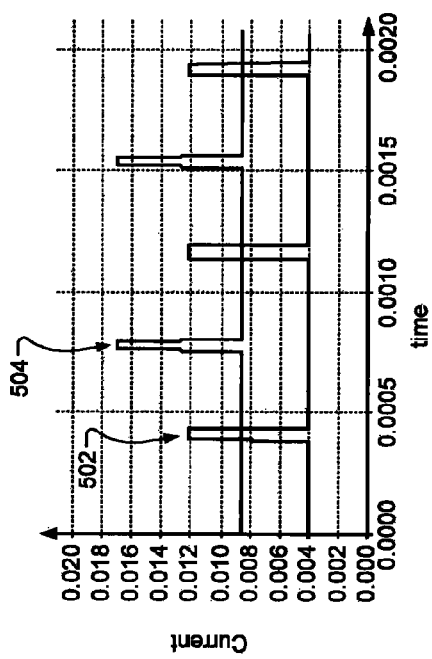
FIGS. 6A-6B are graphs depicting exemplary current and voltage pulses output by the directional speed sensor when the shaft is rotating in a first direction.

As shown in FIG. 6A, the first Hall-effect module 104 generates a current pulse 602 of a second predetermined pulse width when the tooth passes the first Hall-effect module 104 in the second direction. The second Hall-effect module 106 also generates a current pulse 604 of the second predetermined pulse width when the tooth passes the second Hall-effect module 106 in the second direction. As can be seen from the current pulses in FIGS. 5A and 6A, the first and second predetermined pulse widths are different.

As the Hall-effect modules 104-106 are electrically connected in parallel, the current output of the directional speed sensor 100 corresponds to a sum of the currents output by the Hall-effect modules 104-106. The current pulses generated by the Hall-effect modules 104-106 are therefore reflected in the current output by the directional speed sensor 100. The directional speed sensor 100 outputs the current including the current pulses to the voltage measurement module 304.

The voltage measurement module 304 measures an output voltage of the directional speed sensor 100 based on the current output by the directional speed sensor 100. For example only, the voltage measurement module 304 may include a resistor having a predetermined resistance and the output voltage may be determined based on the voltage across the resistor.

Figure 5B:
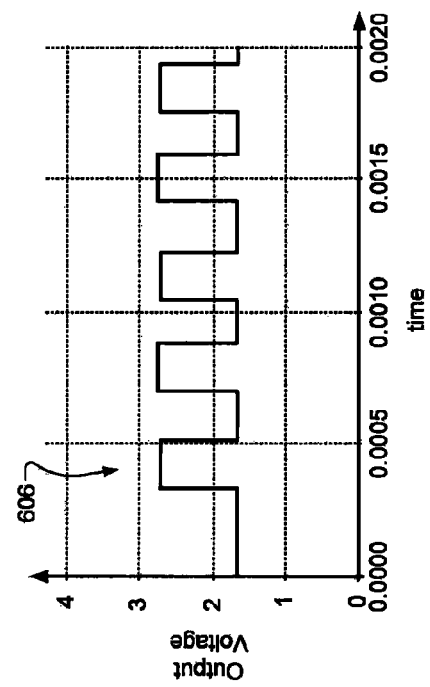
Figure 6B:
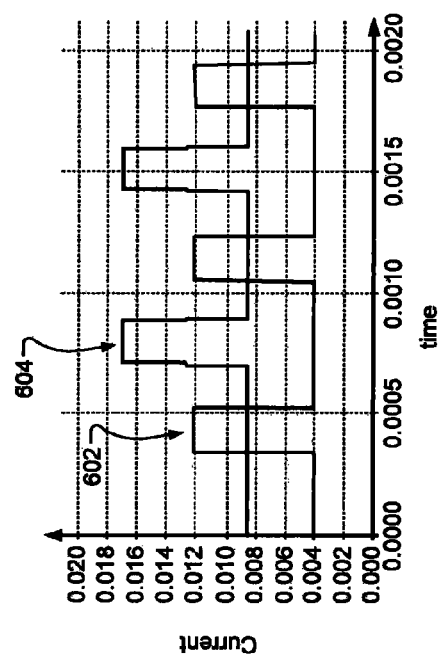

The current pulses output by the directional speed sensor 100 result in corresponding output voltage pulses that may be measured by the voltage measurement module 304. FIG. 5B depicts exemplary voltage pulses 506 that may be measured by the voltage measurement module 304 when the associated shaft 204 rotates in the first direction. FIG. 6B depicts exemplary voltage pulses 606 that may be measured by the voltage measurement module 304 when the associated shaft 204 rotates in the second direction.

The speed/direction determination module 306 may determine the direction of rotation of the associated shaft 204 based on the width of the output voltage pulses. For example only, the speed/direction determination module 306 may determine that the associated shaft 204 is rotating in the first direction when the width of the output voltage pulses are approximately equal to the first predetermined pulse width. The speed/direction determination module 306 may determine that the associated shaft 204 is rotating in the second direction when the width of the pulses are approximately equal to the second predetermined pulse width.

The speed/direction determination module 306 determines the rotational speed of the associated shaft 204 based on the output voltage pulses. In some implementations, the speed/direction determination module 306 may determine the rotational speed of the associated shaft 204 based on the period of time between two output voltage pulses and angular rotation between two of the teeth (i.e., 360°/N).

In other implementations, the speed/direction determination module 306 may determine the rotational speed of the associated shaft 204 based on the period of time between every-other output voltage pulse and angular rotation between two of the teeth. In still other implementations, the speed/direction determination module 306 may determine the rotational speed of the associated shaft 204 based on a number of output voltage pulses received during each predetermined period (e.g., 100 ms). In other implementations, the output current of the directional speed sensor 100 may be measured. In such implementations, the speed/direction determination module 306 may determine the rotational speed and direction of rotation of the associated shaft 204 based on the current pulses.

FIG. 4 is an exemplary diagram of the directional speed sensor system 200. The speed and direction module 230 supplies power (VS) to the directional speed sensor 100. The input wire 108 connects the power source to the input of the directional speed sensor 100. The directional speed sensor 100 generates the current output based on the rotation of the toothed wheel 202. The output wire 110 connects the output of the directional speed sensor 100 to a first node 402 of a resistor 404. A second node 406 of the resistor 404 is connected to a ground source. The ground source may be common to the power source.

In various implementations, the resistance of the resistor 404 may include a resistance of between approximately 131 ohms and approximately 200 ohms. The output voltage of the directional speed sensor 100 may be measured based on the voltage at the first node of the resistor 404 or the voltage across the resistor 404. The speed and direction of rotation of the associated shaft 204 may be determined based on the output voltage pulses.

Figure 7:
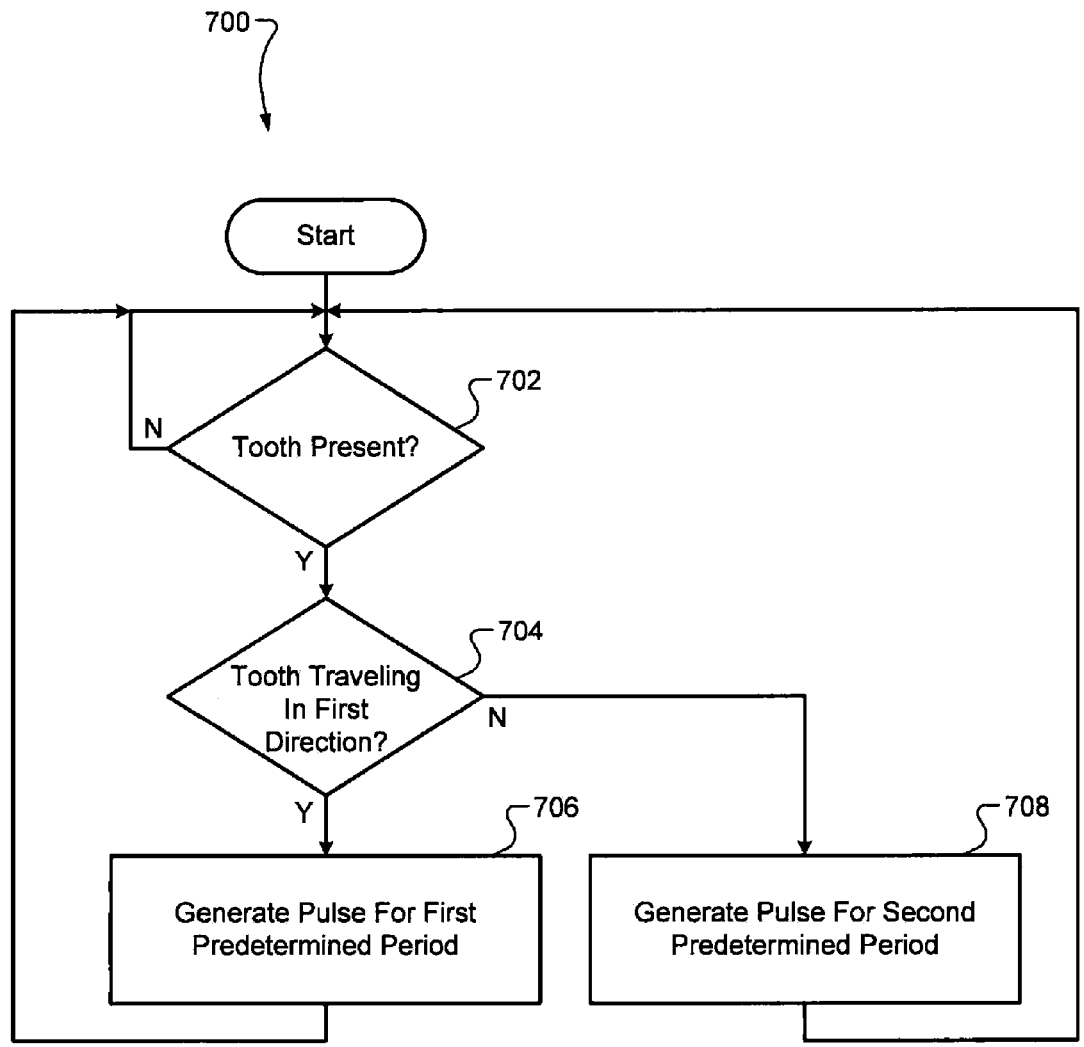
FIG. 7 is a flowchart depicting an exemplary method.

Referring now to FIG. 7, a flowchart depicting exemplary steps performed by a method 700 is presented. The method 700 includes exemplary steps that may be performed by one of the Hall-effect modules 104-106. The other one of the Hall-effect modules 104-106 may perform steps that may be similar or identical to those of the method 700.

The method 700 begins in step 702 where the method 700 determines whether a tooth (e.g., a leading edge) of the toothed wheel 202 is present. If true, the method 700 continues to step 704; otherwise, the method 700 remains in step 702. The method 700 may determine whether the tooth is present based on the magnetic flux (i.e., the Hall-effect).

The method 700 determines whether the tooth detected in step 702 is traveling in the first direction in step 704. If true, the method 700 generates a current pulse for the first predetermined period in step 706. If false, the tooth is traveling in the second direction, and the method 700 generates a current pulse for the second predetermined period in step 708. The method 700 then returns to step 702.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A directional speed sensor for a vehicle, comprising:
a first Hall-effect module that outputs a first current pulse for a first predetermined period when a tooth of a toothed wheel that rotates with a shaft of the vehicle passes the first Hall-effect module in a first direction of rotation and that outputs the first current pulse for a second predetermined period when the tooth passes the first Hall-effect module in a second direction of rotation; and
a second Hall-effect module that is electrically connected in parallel with the first Hall-effect module, that is angularly offset from the first Hall-effect module with respect to a center of the shaft, that outputs a second current pulse for the first predetermined period when the tooth of the toothed wheel passes the second-Hall-effect module in the first direction, and that outputs the second pulse for the second predetermined period when the tooth passes the second Hall-effect module in the second direction,
wherein the second predetermined period is one of greater than and less than the first predetermined period, and
wherein the second current pulse is generated one of before and after the first current pulse.

2. A directional speed sensor system, comprising:
the directional speed sensor of claim 1; and
a speed and direction module that monitors voltage pulses corresponding to current pulses output by the directional speed sensor, that determines which one of the first and second directions that the shaft is rotating based on at least one of the voltage pulses, and that determines a rotational speed of the shaft based on at least one of the voltage pulses.

3. The directional speed sensor system of claim 2 wherein the speed and direction module determines the one of the first and second directions that the shaft is rotating based on a period of the at least one of the voltage pulses.

4. The directional speed sensor system of claim 3 wherein the speed and direction module determines that the shaft is rotating in the first direction when the period of the at least one of the voltage pulses is approximately equal to the first predetermined period.

5. The directional speed sensor system of claim 3 wherein the speed and direction module determines that the shaft is rotating in the second direction when the period of the at least one of the voltage pulses is approximately equal to the second predetermined period.

6. The directional speed sensor system of claim 2 wherein the speed and direction module determines the rotational speed of the shaft based on a period between two consecutive ones of the voltage pulses.

7. The directional speed sensor system of claim 2 wherein the speed and direction module determines the rotational speed of the shaft based on a number of the voltage pulses during a predetermined period.

8. The directional speed sensor system of claim 2 wherein the speed and direction module determines the rotational speed of the shaft based on a period between two of the voltage pulses corresponding to two current pulses generated by one of the first and second Hall-effect modules.

9. The directional speed sensor of claim 1 wherein the first and second Hall-effect modules receive power via a first wire and output the first and second current pulses via a second wire, and
wherein a total number of wires electrically connected to the directional speed sensor is limited to two.

10. The directional speed sensor of claim 1 wherein centerlines of the first and second Hall-effect modules are separated by a distance that is one of less than and equal to a length of the tooth.

11. A directional speed sensor for a vehicle, comprising:
a first Hall-effect module that generates a first pulse in an output current of the directional speed sensor for a first predetermined period when a tooth of a toothed wheel that rotates with a shaft of the vehicle passes the first Hall-effect module in a first rotational direction and that generates the first pulse for a second predetermined period when the tooth passes the first Hall-effect module in a second rotational direction; and
a second Hall-effect module that is angularly offset from the first Hall-effect module with respect to a center of the shaft, that generates a second pulse in the output current for the first predetermined period when the tooth of the toothed wheel passes the second Hall-effect module in the first rotational direction, and that generates the second pulse for the second predetermined period when the tooth passes the second Hall-effect module in the second rotational direction,
wherein the second predetermined period is one of greater than and less than the first predetermined period, and
wherein the second pulse is generated one of before and after the first pulse.

12. A directional speed sensor system, comprising:
the directional speed sensor of claim 11; and
a speed and direction module that monitors pulses output by the directional speed sensor, that determines which one of the first and second directions that the shaft is rotating based on at least one of the pulses, and that determines a rotational speed of the shaft based on at least one of the pulses.

13. The directional speed sensor system of claim 12 wherein the speed and direction module determines the one of the first and second directions that the shaft is rotating based on a period of the at least one of the pulses.

14. The directional speed sensor system of claim 13 wherein the speed and direction module determines that the shaft is rotating in the first direction when the period of the at least one of the pulses is approximately equal to the first predetermined period.

15. The directional speed sensor system of claim 13 wherein the speed and direction module determines that the shaft is rotating in the second direction when the period of the at least one of the pulses is approximately equal to the second predetermined period.

16. The directional speed sensor system of claim 12 wherein the speed and direction module determines the rotational speed of the shaft based on a period between two consecutive ones of the pulses.

17. The directional speed sensor system of claim 12 wherein the speed and direction module determines the rotational speed of the shaft based on a number of the pulses during a predetermined period.

18. The directional speed sensor system of claim 12 wherein the speed and direction module determines the rotational speed of the shaft based on a period between two of the pulses corresponding to two pulses generated by one of the first and second Hall-effect modules.

19. The directional speed sensor of claim 11 wherein the first and second Hall-effect modules receive power via a first wire and output the first and second pulses via a second wire, and
wherein a total number of wires electrically connected to the directional speed sensor is limited to two.

20. The directional speed sensor of claim 11 wherein centerlines of the first and second Hall-effect modules are separated by a distance that is one of less than and equal to a length of the tooth.

* * * * *